July 31, 1951  C. GERST  2,562,542
FRONT WHEEL AXLE MOUNTING
Filed Nov. 5, 1947  3 Sheets-Sheet 1

INVENTOR.
CHRIS GERST
BY
Gustav A. Wolf
ATT.

July 31, 1951 C. GERST 2,562,542
FRONT WHEEL AXLE MOUNTING
Filed Nov. 5, 1947 3 Sheets-Sheet 2
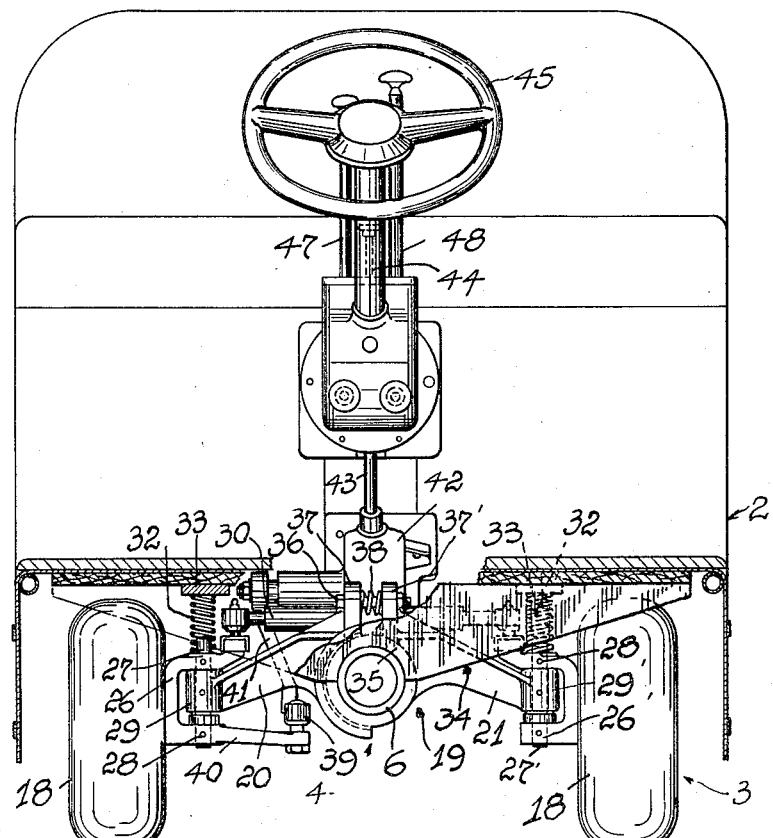
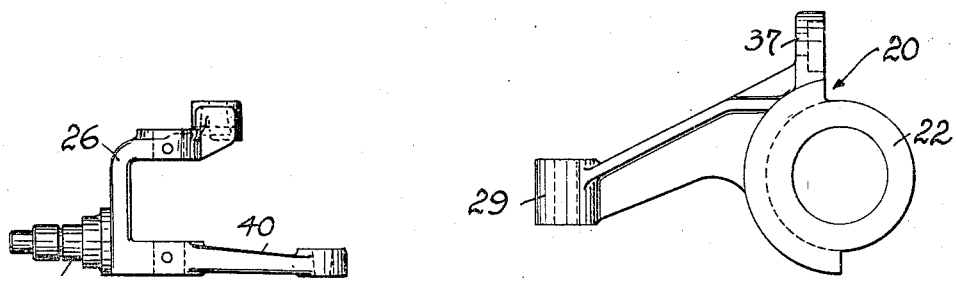
INVENTOR.
CHRIS GERST July 31, 1951  C. GERST  2,562,542
FRONT WHEEL AXLE MOUNTING
Filed Nov. 5, 1947  3 Sheets-Sheet 3
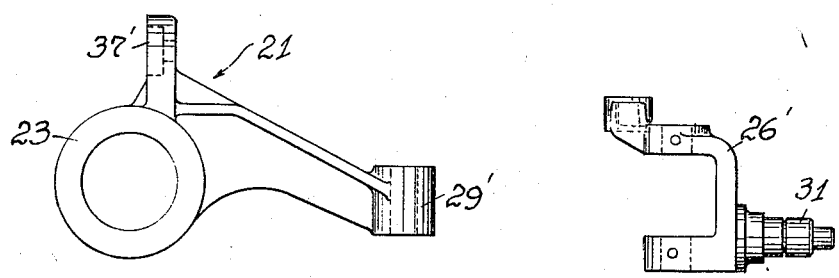
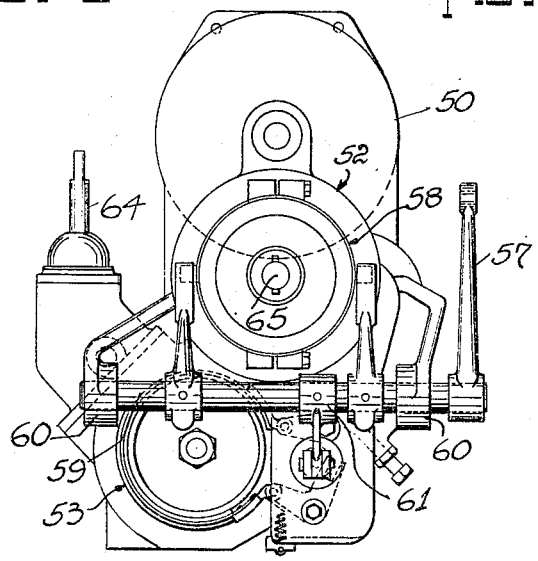
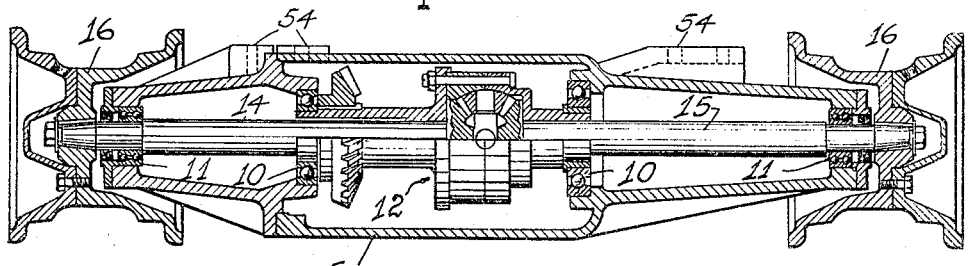
INVENTOR.
CHRIS GERST
BY
ATT.

Patented July 31, 1951

2,562,542

UNITED STATES PATENT OFFICE 2,562,542

FRONT WHEEL AXLE MOUNTING

Chris Gerst, Detroit, Mich., assignor to The Transmission & Gear Company, Dearborn, Mich., a corporation of Michigan Application November 5, 1947, Serial No. 784,270

3 Claims. (Cl. 280—112)

This invention relates in general to self-propelled vehicles and, more particularly, to self-propelled go-carts of the type used for transporting persons and loads in manufacturing plants, etc.

The primary object of the invention is the provision of a self-propelled, sturdy and economical go-cart constructed to include a wheeled chassis with a frame member formed by a transmission housing and a tubular member secured to said housing and forwardly extended therefrom to permit the frame member to rotatably support in its transmission housing a rear axle and pivotally support at the exposed end portion of its tubular member the axle sections of a split front axle.

Another object of the invention is the provision of a self-propelled go-cart constructed to include a wheeled chassis with a frame member formed by a transmission housing and a tubular member secured to said housing and forwardly extended therefrom to permit the frame member to directly mount on its transmission housing an engine and pivotally support on its tubular member the axle sections of a split front axle coupled with a steering mechanism attached to the tubular member.

A further object of the invention is the provision of a self-propelled go-cart constructed to include a wheeled chassis with a frame member formed by a transmission housing and a tubular member secured to said housing and forwardly extended therefrom to permit the frame member to be supported on driving wheels secured to a rear axle mounted in the transmission housing, and wheels rotatably mounted on the axle sections of a split front axle pivotally mounted on the exposed end portion of the tubular member.

With the above and other objects in view, the invention has certain other marked superiorities which radically distinguish it from presently known structures. These improvements or superiorities embodying certain novel features of construction are clearly set forth in the following specification and the appended claims; and a preferred form of embodiment of the invention is hereinafter shown with reference to the accompanying drawings forming part of the specification.

In the drawings:

Fig. 2 is a front elevation, partly broken away, of the go-cart shown in Fig. 1.

Fig. 3 is a front view of the right steering knuckle; and

Fig. 4 is a front view of the right section of the split front axle.

Fig. 5 is a front view of the left section of the split front axle; and

Fig. 6 is a front view of the left steering knuckle.

Fig. 7 is a rear view of the frame member showing the transmission housing mounting the engine and the operating lever arrangement for the transmission, clutch brake arrangement; and Fig. 8 is a transversal sectional view through the transmission and its housing.

Figure 1:
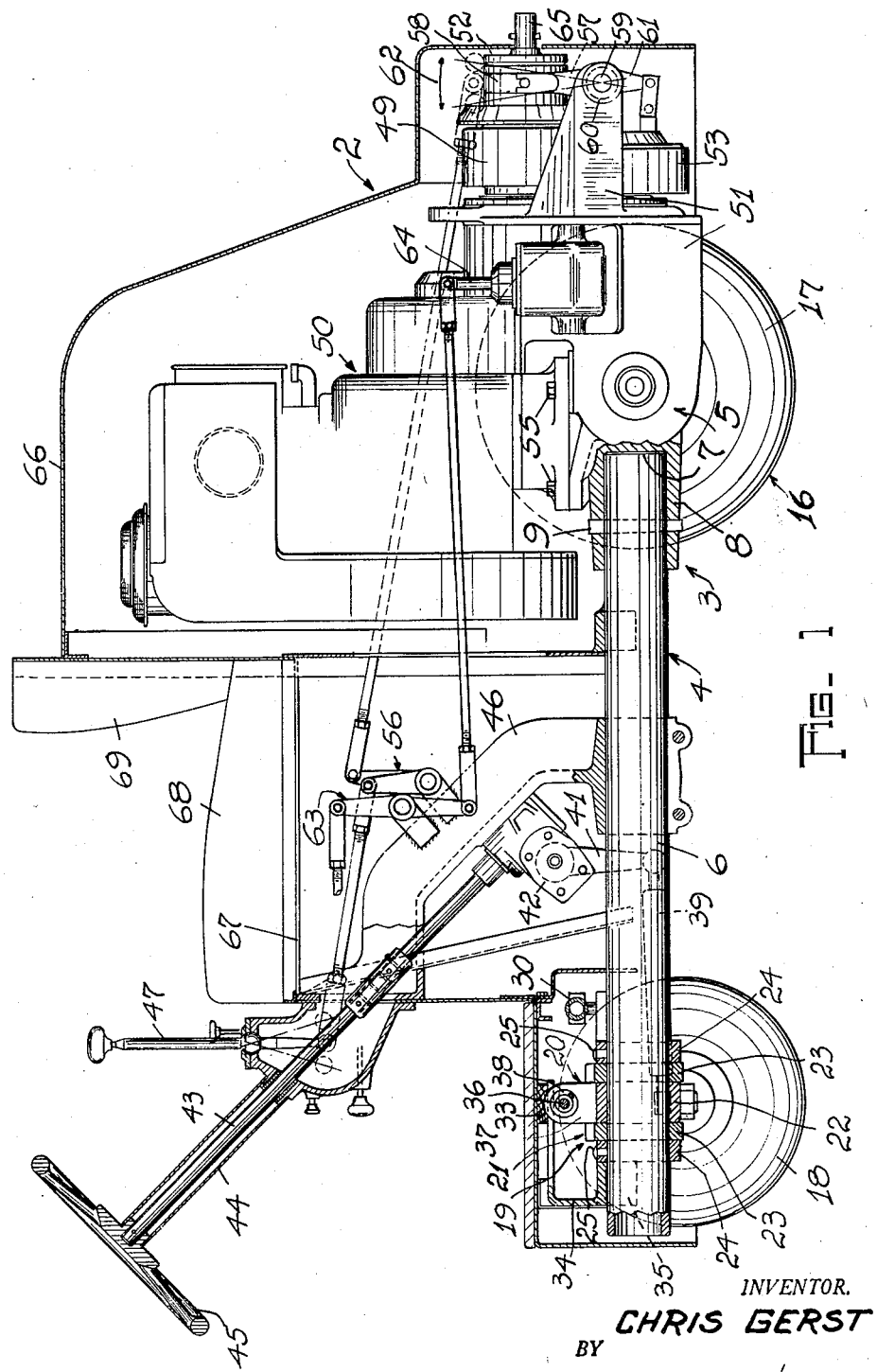
Fig. 1 is a longitudinal sectional view through a self-propelled go-cart constructed in accordance with the invention.

Referring now in detail to the drawings, numeral 2 denotes a self-propelled go-cart, the wheeled chassis 3 of which embodies a frame member 4. This frame member consists of a transmission housing 5 and a tubular member 6 which is extended into the bore 7 of a cylindrical extension 8 on housing 5 and rigidly secured to said extension by a pin 9. Housing 5 supports in bearings 10 and 11 a differential drive 12, the shafts 14 and 15 of which mount on their outer ends drive wheels 16 carrying rubber tires 17, so that housing 5 forming the rear end of frame 4 is directly supported by wheels 16. The outer end of frame 4 is supported by wheels 18 yieldingly coupled with tubular member 6 by a split front axle 19. This axle has its axle sections 20 and 21 rotatably mounted on tubular member 6, axle section 20 with a single circular bearing portion 22 being freely rotatably sleeved upon tubular member 6, and axle section 21 with two spaced bearing portions 23 being freely rotatably sleeved upon said tubular member, so that bearing portion 22 of axle section 20 is arranged between the bearing portions 23 of axle section 21. A pair of collar members 24 on tubular member 6, secured thereto by rivets 25, prevent axial shifting of bearing portions 22 and 23. Each of the thus mounted axle sections supports a steering knuckle 26, 26', respectively, by means of a king pin 27, 27'. This king pin is secured to the respective steering knuckle by pins 28 and extended through a perforated projection 29, 29' on the respective axle sections 20, 21. The steering knuckles are connected with each other by a spacer bar or tie rod assembly 30 and support on their spindles 31 front wheels 18.

Rotation of front axle sections 20 and 21 on tubular member 6 is counteracted by compression springs 32, 32'. These springs are seated on the respective steering knuckles and engaged at their upper ends with rearwardly extended projections 33, 33' on a bracket member 34 which has its lower central portion 35 welded to tubular member 6. In addition, front axle sections 20 and 21 are positively stopped from excessive relative rotary movement with respect to each other by a bolt member 36 which is extended through oppositely arranged uprights 37, 37' on front axle sections 20 and 21. Bolt member 36 supports a compression spring 38 arranged between uprights 37, 37', which spring cooperates with springs 32 in yieldingly counteracting rotation of front axle sections 20 and 21 on tubular member 6. The steering knuckles 26, 26' are set in motion by means of a drag link assembly 39 and the tie rod assembly 30, and for such purpose steering knuckle 26 includes a lever 40 coupled by drag link assembly 39 with the steering lever 41 of a worm drive in a gear box 42, which drive is actuated by a steering shaft 43 in a steering column 44. Steering shaft 43 extends at an inclination upwardly and forwardly of split front axle 19 and has attached to its upper end a steering wheel 45. Gear box 42 and steering column 44 are supported by a bracket member 46 welded to tubular member 6 of frame 4. This bracket member additionally supports levers 47 and 48 controlling a clutch transmission and brake arrangement 49 directly mounted on housing 5. Thus, housing 5 in addition to engine 50 supports by means of a bracket 51 a clutch arrangement 52 and a brake arrangement 53. As shown, housing 5 includes perforated bosses 54 to permit proper attachment of engine 50 to said housing by bolts 55. The clutch shift lever 47 controls the clutch arrangement 52 and for such purpose is coupled over bell crank device 56 and lever 57 with a collar member 58 actuating clutch arrangement 52. Lever 57 is attached to a shaft 59 pivoted in bearings 60 on bracket member 51. This shaft supports a lever 61 actuating the brake arrangement 53 when lever 57 is shifted from neutral position in either direction as indicated by double arrow 62. The gear shift lever 48 is coupled over bell crank device 63 with a lever 64 which controls the transmission and therewith the ratio of speed of crank shaft 65.

Preferably, as shown, the rear portion of the go-cart is covered by a hood member 66 and the front portion of such cart has mounted on its raised platform 67 a cushioned seat 68 with a back rest 69 which seat is arranged to permit operation of steering wheel 45 and clutch and gear shift levers 47 and 48 when the driver rests on such seat.

The described construction of frame member 4 and its mounting on rear wheels 16 and front wheels 18 provide proper yielding support of the frame member by its supporting wheels. This is particularly true for the front portion of the go-cart which supports the driver seat and the controlling levers for the clutch and gear mechanism. Thus, this front portion of the frame member, being supported by a split front axle with individually sprung axle sections 20 and 21, will pass with its wheels over rough spots without excessive or troublesome jars on the frame member and the steering mechanism, and the frame member, in its entirety being composed of a transmission housing and a tubular member forwardly extended therefrom, will provide properly located supporting means for proper rotatable support of the front axle sections, the rear axle, the engine, the clutch transmission and brake devices, and thus permit distribution of all weights for quick and easy handling and proper traction of the go-cart.

Having thus described my invention, what I claim is:

1. In a go-cart including as a frame an elongated tubular member extended longitudinally of said go-cart, an elongated bracket member rigidly attached to the front portion of said tubular member and extended crosswise thereof, a split front axle including oppositely arranged axle sections mounting on their outer ends on king pins steering knuckles and swiveled with their inner ends to said tubular member, axially thereof below said bracket member, coupling means yieldingly connecting the swiveled inner ends of said axle sections with each other for limited yielding movement with respect to each other, and compression springs seated on the said steering knuckles in axial alignment with their swivel axes and engaged with said bracket member to yieldingly counteract movements between the axle sections and the tubular member in any swivel position of said steering knuckle.

2. A go-cart as described in claim 1, wherein the inner ends of the axle sections of the split front axle include bearing portions sleeved upon said tubular member, and upright portions arranged adjacent to said bearing portions in opposed relation with respect to each other, and wherein bolt and spring means yieldingly connect the said upright portions with each other and yieldingly limit relative movements of the axle sections with respect to each other.

3. In a go-cart including as a frame an elongated tubular member longitudinally extended of said go-cart, a split front axle having oppositely arranged axle sections mounting on their outer ends on king pins steering knuckles and provided at their inner ends with bearing portions sleeved upon said tubular member for swivel connection therewith, coupling means yieldingly connecting the bearing portions of said axle sections for limited movement with respect to each other, an elongated bracket member secured to said tubular member crosswise thereof directly above said split front axle and compression springs seated on said steering knuckles and engaged with said bracket member for yieldingly spacing the outer ends of said axle sections from said bracket member.

CHRIS GERST.

REFERENCES CITED

The following references are of record in the file of this patent:

UNITED STATES PATENTS

| Number | Name | Date |
|---|---|---|
| 1,120,036 | Dearing | Dec. 8, 1914 |
| 1,452,557 | Harroun | Apr. 24, 1923 |
| 1,974,033 | Nallinger | Sept. 18, 1934 |
| 2,083,457 | Ledwinka | June 8, 1937 |
| 2,183,940 | Porsche | Dec. 19, 1939 |
| 2,378,615 | Brown | June 19, 1945 |

FOREIGN PATENTS

| Number | Country | Date |
|---|---|---|
| 183,357 | Switzerland | June 16, 1936 |
| 458,241 | Great Britain | Dec. 15, 1936 |